(12) United States Patent
Poyner

(10) Patent No.: US 7,198,008 B2
(45) Date of Patent: Apr. 3, 2007

(54) DEVICE FOR THE TRAINING OF SCENT DISCRIMINATING DETECTOR DOGS

(76) Inventor: Alvin Harden Poyner, 1252 Saint Brides Rd. W., Chesapeake, VA (US) 23322

( * ) Notice: Subject to any disclaimer, the term of this patent is extended or adjusted under 35 U.S.C. 154(b) by 179 days.

(21) Appl. No.: 11/054,101

(22) Filed: Feb. 10, 2005

(65) Prior Publication Data
US 2006/0174843 A1 Aug. 10, 2006

(51) Int. Cl.
*A01K 15/02* (2006.01)

(52) U.S. Cl. .................. 119/712; 119/905; 119/701

(58) Field of Classification Search ................ 119/712, 119/174, 905, 711, 710, 701; 102/355
See application file for complete search history.

(56) References Cited

U.S. PATENT DOCUMENTS

| | | | | |
|---|---|---|---|---|
| 2,188,237 A * | 1/1940 | Weaver | ...................... | 248/168 |
| 3,266,634 A * | 8/1966 | Tintary | ..................... | 211/131.1 |
| 3,424,132 A * | 1/1969 | Manning et al. | ............ | 119/701 |
| 3,593,943 A * | 7/1971 | Collmann | .................... | 242/129 |
| 3,665,892 A * | 5/1972 | Kusisto | ....................... | 119/701 |
| 3,773,018 A * | 11/1973 | Profughi | ...................... | 119/701 |
| 3,981,274 A * | 9/1976 | Curtis | ........................ | 119/701 |
| 4,244,568 A * | 1/1981 | Ferris et al. | ................. | 273/445 |
| 4,408,955 A * | 10/1983 | Wagle et al. | ................ | 416/119 |
| 4,538,589 A * | 9/1985 | Preston | ........................ | 126/30 |
| 4,553,525 A * | 11/1985 | Ruble | .......................... | 126/30 |
| 4,766,848 A * | 8/1988 | Rocco et al. | ................ | 119/701 |
| 4,850,792 A * | 7/1989 | Yeoman | ...................... | 415/4.2 |
| 4,946,048 A * | 8/1990 | Francois | ...................... | 211/34 |
| 5,065,871 A * | 11/1991 | Chan | ........................... | 211/37 |
| 5,341,709 A * | 8/1994 | Speranza et al. | ............ | 82/1.11 |
| 5,423,435 A * | 6/1995 | Pollard et al. | ................ | 211/37 |
| 5,622,342 A * | 4/1997 | Mills | ........................... | 248/126 |
| 5,829,461 A * | 11/1998 | Ramsey | .................. | 134/167 R |
| 6,024,053 A * | 2/2000 | Huang | ......................... | 119/707 |
| 6,213,056 B1 * | 4/2001 | Bergmann et al. | .......... | 119/704 |
| 6,502,707 B1 * | 1/2003 | Sullivan | ..................... | 211/163 |
| 6,531,145 B1 * | 3/2003 | Reichert | ..................... | 424/408 |
| 6,561,914 B2 * | 5/2003 | Henry | ......................... | 472/13 |
| 6,837,178 B1 * | 1/2005 | Nall et al. | ................. | 119/57.8 |
| 6,843,158 B2 * | 1/2005 | Garcia et al. | ............... | 89/1.13 |
| 6,979,298 B2 * | 12/2005 | Vodyanoy et al. | .......... | 600/529 |
| 7,007,600 B1 * | 3/2006 | Hambright et al. | ......... | 100/237 |
| 7,013,885 B2 * | 3/2006 | Czajkoski | .................... | 126/30 |
| 7,146,934 B1 * | 12/2006 | Staley | ........................ | 119/709 |
| 2001/0047771 A1 * | 12/2001 | Bulanda et al. | ............. | 119/712 |
| 2003/0130568 A1 * | 7/2003 | Vodyanoy et al. | .......... | 600/303 |
| 2004/0050950 A1 * | 3/2004 | Brown | ........................ | 239/55 |
| 2005/0039698 A1 * | 2/2005 | Pope | .......................... | 119/711 |
| 2006/0048712 A1 * | 3/2006 | Boyer | ..................... | 119/57.91 |
| 2006/0283394 A1 * | 12/2006 | McLaughlin | ............. | 119/51.03 |

FOREIGN PATENT DOCUMENTS

GB 2127266 A * 4/1984

\* cited by examiner

*Primary Examiner*—Yvonne R. Abbott

(57) ABSTRACT

The Scent-A-Wheel device consists of several different parts connected together to form a device that acts like a carousel. The device consists of a hub (ball bearing or axle design), arms attached to the hub ("spokes"), a two-piece, adjustable shaft to support that hub and arms, and a base of four "legs" to provide stability and support. A ball bearing within the hub allows the hub and arms to turn on the base.

1 Claim, 4 Drawing Sheets

DEVICE FOR THE TRAINING OF SCENT DISCRIMINATING DETECTOR DOGS

CROSS-REFERENCE TO RELATED APPLICATIONS

[Not Applicable]

STATEMENT REGARDING FEDERALLY SPONSORED RESEARCH OR DEVELOPMENT

[Not Applicable]

REFERENCE TO SEQUENCE LISTING, A TABLE, OR A COMPUTER PROGRAM LISTING COMPACT DISK APPENDIX

[Not Applicable]

BACKGROUND OF THE INVENTION

Currently there are no other known carousel devices available to companies attempting to provide security services to federal, state, and local law enforcement agencies and independent consultants internationally that allows one trainer present a stationary canine with different types of substances. The only known carousel devices used with animals are feeding devices for agrarian animals, or carousel type devices for training horses entailing horse moving around in a circle. None of these devices are adaptable to, on scale with, as portable as, or even resemble the claimed invention.

BRIEF SUMMARY OF THE INVENTION

This device is pertinent to entities providing security services and will be of great use in training canine units of various law enforcement and homeland security agencies in the detection and interdiction of non-permissive, hazardous, and/or explosive substances, specifically by allowing one handler to control a dog and provide him with six different locations for the placement of the training aids that can be removed and sterilized after each use. Because of the ball-bearing hub center, the dog can be walked around the device or the device can be turned so that each arm is presented to a stationary dog. The invention is adjustable in height to accommodate various sizes of dogs. The finished invention unit allows easy portability; the device can be broken down and carried on airplanes nationally and internationally in a golf-club sized tote bag as it is made of lightweight metal parts that are collapsible. All parts fit interchangeably and reassemble with ease.

DETAILED DESCRIPTION OF THE PREFERRED EMBODIMENT

Figure 1:
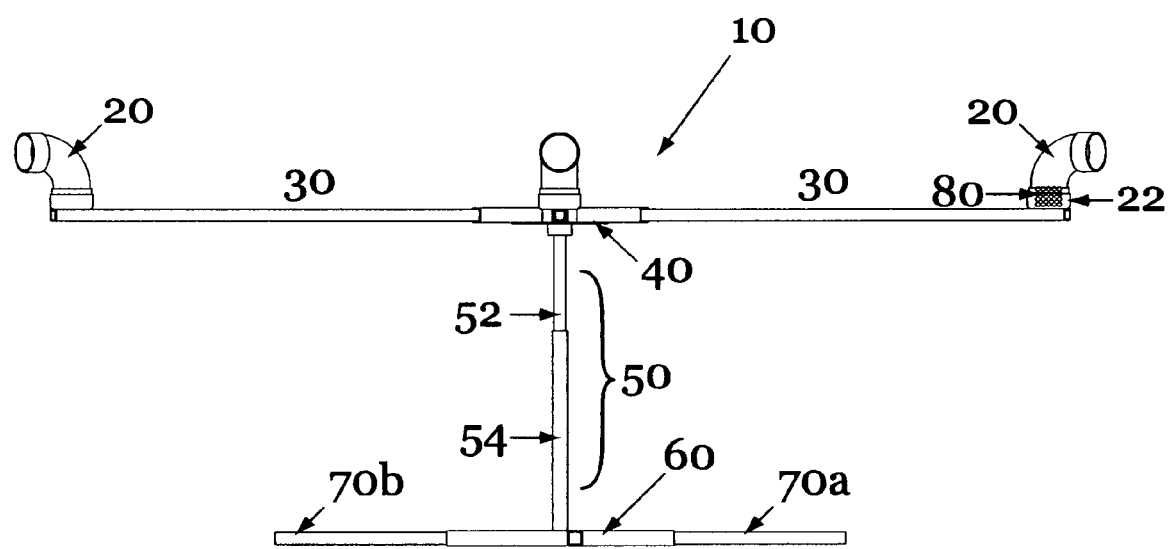
FIG. 1 is a side view of the training device.

Shown in FIG. 1 is a device for the training of scent discrimination detector dogs 10 that is adjustable in a plurality of different heights, specifically in the vertical plane, and embodying the present invention.

The device for the training of scent discrimination detector dogs 10 includes a plurality of arms 30 having first and second ends. A plurality of elbows 20 are attached to first end of arms 30 and second end of arms 30 are connected to a central hub 40 wherein the central hub 40 consist of a metal housing and ball bearings or axle design which permit the central hub 40 to rotate about a central shaft 50. The plurality of elbows 20 are connected to the first end of the plurality of arms wherein one or more of said elbows 20 house scented material 80. The scented material 80 is placed into one or more of the plurality of elbows 20 to train the dogs ho to recognize specific scents. There is a plurality of cups 22 inside the elbows 20 which are used to hold the scented material 80.

The central shaft 50 consist of two telescoping tubular fittings, the top telescoping tube 52 and the lower telescoping tube 54, which allows the shaft 50 to be adjusted vertically. The shaft 50 is connected to a base 60 comprising a plurality of legs 70 that provides support for the device on a floor or other such support surface.

The plurality of arms 30 is detachable from the central hub 40 to facilitate transport and storage of the device. The plurality of legs 70 is detachable from the base 60 to facilitate transport and storage of the device.

Figure 2:
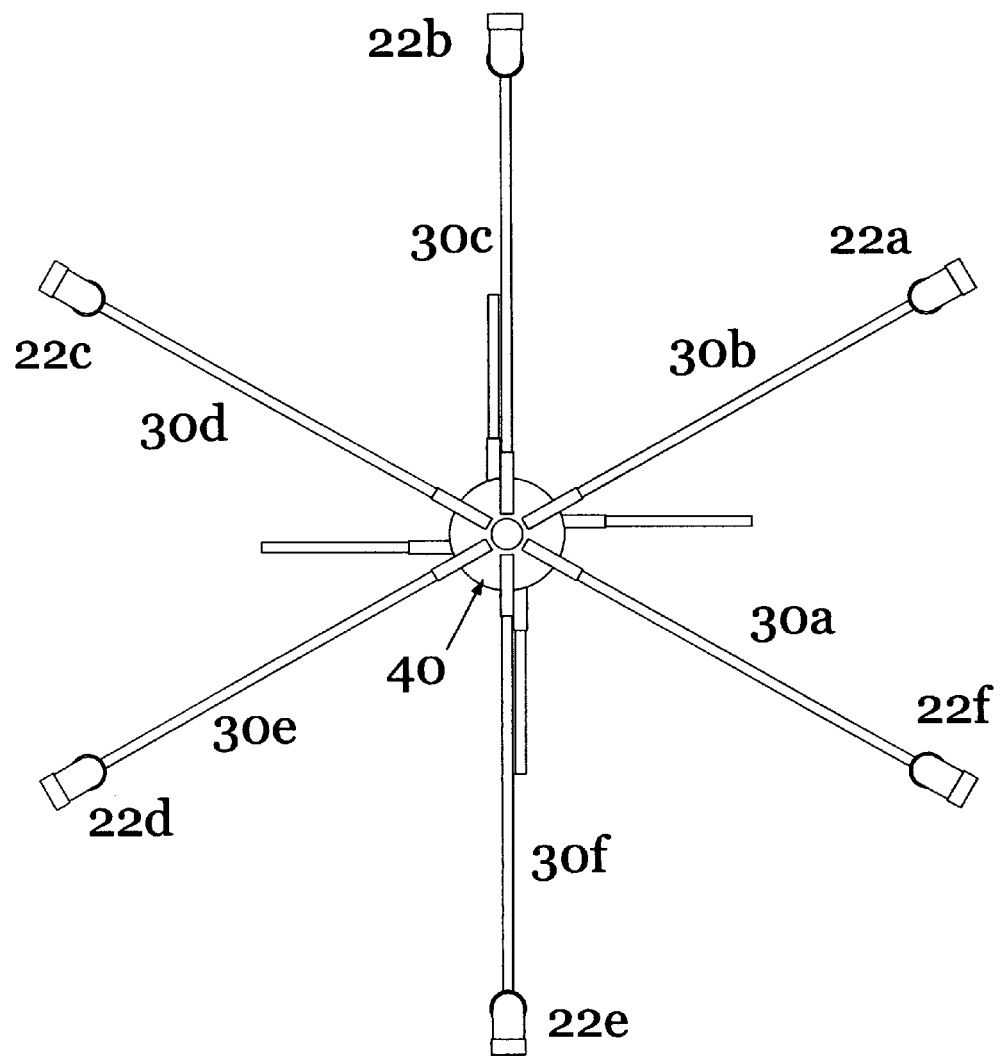
FIG. 2 is a top view of the device.

FIG. 2 is a top view of the device for the training of scent discrimination detector dogs 10 which includes a plurality of cups 22 that are inserted inside the elbows 20 and hold scented material 80. The plurality of elbows 20 are connected to the first end of the plurality of arms 30. The second end of the plurality of arms 30 are connected to the hub 40.

Figure 3:
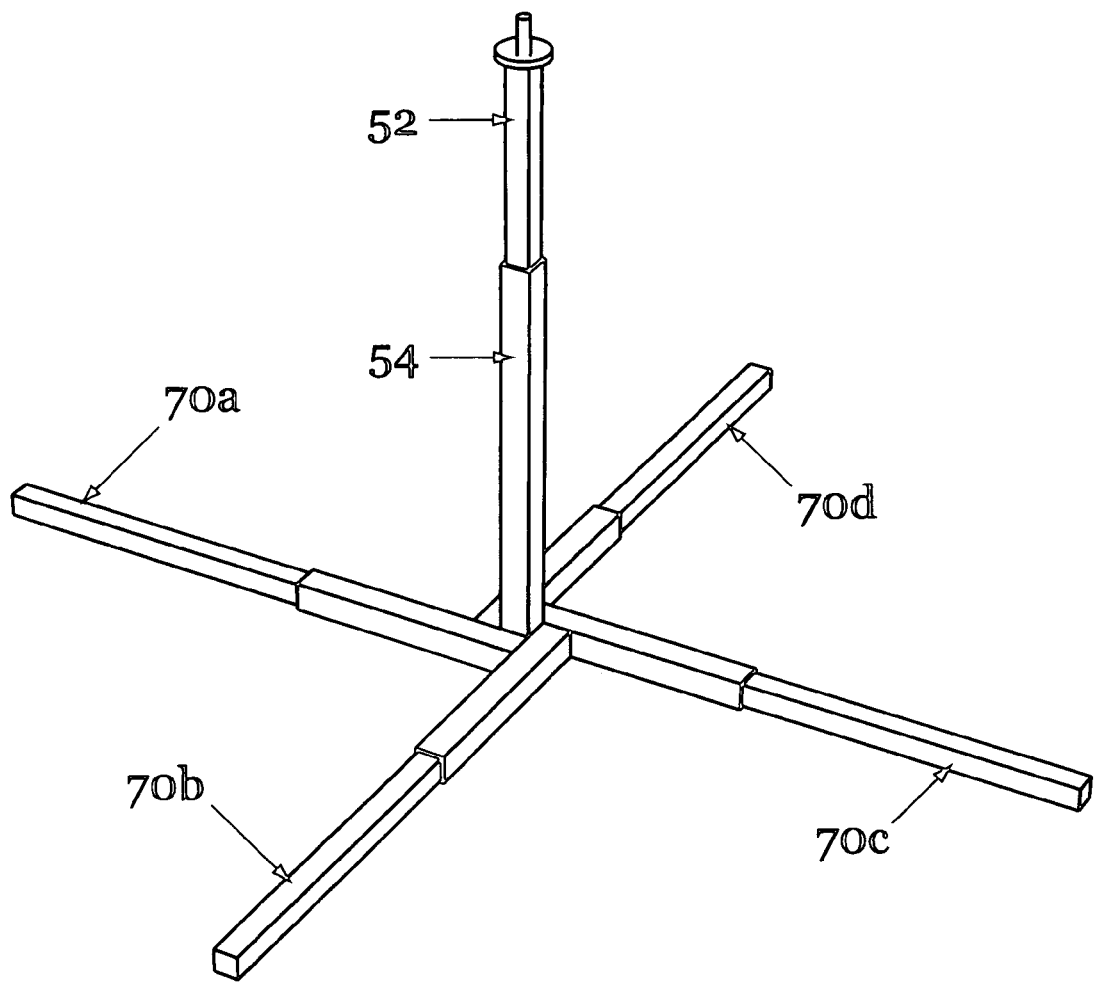
FIG. 3 is an isometric view of the base of the device.

FIG. 3 is an isometric view of the base of the device for the training of scent discrimination detector dogs 10. The central shaft 50 consist of two telescoping tubular fittings, the top telescoping tube 52 and the lower telescoping tube 54, which allows the shaft 50 to be adjusted vertically. The shaft 50 is connected to a base 60 comprising a plurality of legs 70 that provides support for the device on a floor or other such support surface.

Figure 4:
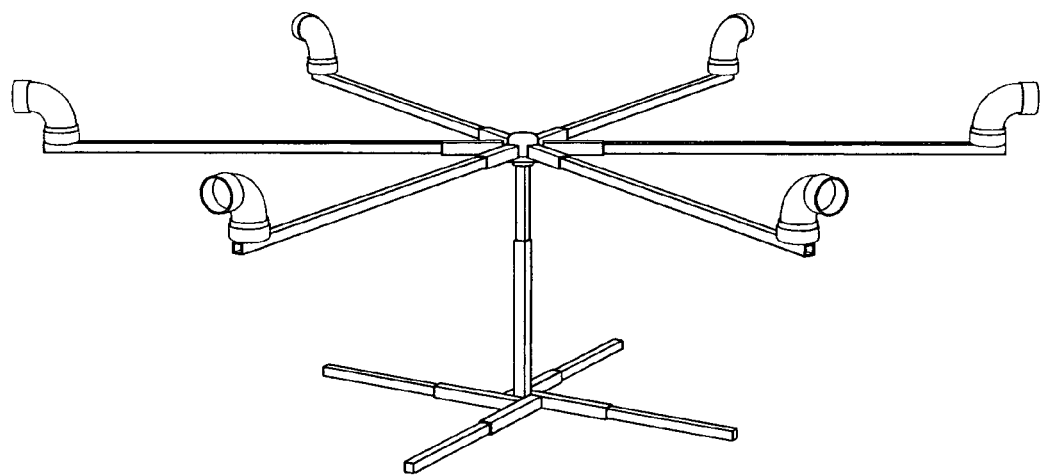
FIG. 4 is an isometric view of the device.
Device Items listed as:
Elbow 20 (a–f)
Cup 22 (a–f)
Arm 30 (a–f)
Hub 40
Shaft 50
Telescoping Tube 52, 54
Base 60
Legs 70 (a–d)
Scented material 80

FIG. 4 is an isometric view of the device for the training of scent discrimination detector dogs 10.

It is understood that while certain forms of the present invention have been illustrated and described herein, it is not to be limited to the specific forms or arrangements of parts described and shown.

I claim:

1. A device for the training of scent discriminating detector dogs comprising:
   a plurality of arms each having first and second ends;
   wherein outwardly projecting elbows are attached to said first ends, and wherein one or more of said elbows house scented material;
   wherein said second ends of said plurality of arms are connected to a central hub;
   wherein said central hub consists of a metal housing and two ball bearings which permit the central hub to rotate about a central shaft;

wherein said central shaft consists of two telescoping tubular fittings which allow said shaft to adjust vertically;

wherein said shaft is connected to a base comprising a plurality of legs that provide support for the device;

wherein said plurality of arms is detachable from said central hub, and said plurality of legs are detachable from said base to facilitate transport and storage of the device; and wherein said scented material is placed into said one more of plurality of elbows to train the dogs how to recognize specific scents.

* * * * *